United States Patent [19]

Nusbaumer et al.

[11] Patent Number: 4,768,678
[45] Date of Patent: Sep. 6, 1988

[54] METHOD FOR MANUFACTURING A COMPOSITE FOAMED WATER-HEATER BODY FROM A FOAMED FIBER-REINFORCED POLYESTER RESIN AND THE RESULTANT PRODUCT

[76] Inventors: Charles Nusbaumer, Route de Toulaud, 07130 Soyons; Paul-Joseph Eynard, 19 rue de Sully, 26000 Valence, both of France

[21] Appl. No.: 918,583

[22] Filed: Oct. 9, 1986

Related U.S. Application Data

[63] Continuation of Ser. No. 717,184, filed as PCT FR 84/00171 on Jul. 11, 1984, published as WO 85/00552 on Feb. 14, 1985, abandoned.

[30] Foreign Application Priority Data

Jul. 12, 1983 [FR] France ................................ 83 11789

[51] Int. Cl.$^4$ ...................... B65D 25/18; B29C 67/22; B29C 39/10
[52] U.S. Cl. ................................... 220/444; 220/414; 220/468; 264/45.3; 264/45.5; 264/46.7; 264/46.9; 264/54; 264/271.1; 264/DIG. 5
[58] Field of Search ..................... 264/46.9, 45.3, 45.5, 264/46.7, DIG. 5, 54, 271.1; 220/414, 444, 468

[56] References Cited

U.S. PATENT DOCUMENTS

| 2,975,488 | 3/1961 | Brauner | 264/45.3 |
|---|---|---|---|
| 4,351,911 | 9/1982 | Fox | 264/45.3 X |
| 4,379,104 | 4/1983 | Koorevaar | 264/46.9 X |
| 4,440,876 | 4/1984 | Mazzola et al. | 264/45.3 X |
| 4,447,377 | 5/1984 | Denton | 264/46.9 X |
| 4,464,320 | 8/1984 | Saidla | 264/45.3 |
| 4,476,076 | 10/1984 | Saidla | 264/45.3 |

FOREIGN PATENT DOCUMENTS 2635013  2/1978  Fed. Rep. of Germany ..... 264/46.9

Primary Examiner—Philip Anderson
Attorney, Agent, or Firm—Frost & Jacobs

[57] ABSTRACT

Method for obtaining a plastic water-heater body, wherein
(1) a plastic shell is used which is intended to form the interior of the water heater and also serves as an internal molding wall, the said shell having at least one orifice,
(2) the said shell is positioned inside a mold consisting of two parts, while providing a space between the outside of the shell and the inside of the mold, the mold having an opening,
(3) water is introduced into the internal shell via the said orifice,
(4) a liquid mixture consisting essentially of a polyester resin composition capable of foaming and polymerizing is cast via the said opening of the mold, by cooling the outside of the mold to a temperature of approximately 10° to 15° C. during casting of the resin, so as to obtain a skin effect on the surface of the foam which comes into contact with the mold during polymerization of the said foam, by controlling the temperature of the expanding and polymerizing resin so that it does not exceed approximately 40° C.

21 Claims, 3 Drawing Sheets

METHOD FOR MANUFACTURING A COMPOSITE FOAMED WATER-HEATER BODY FROM A FOAMED FIBER-REINFORCED POLYESTER RESIN AND THE RESULTANT PRODUCT

This is a continuation of application Ser. No. 06/717,184, filed as PCT FR84/00171 on Jul. 11, 1984, published as WO85/00552 on Feb. 14, 1985 and now abandoned.

The present invention relates to a method for obtaining a water-heater body from a plastic material based on fiber-reinforced polyester. The problems posed by the construction of water-heater bodies are numerous. It is necessary, in fact, to manufacture an apparatus, the internal surface of which meets the requirements with respect to contact with alimentary substances (water), which is leakproof and which is resistant both to high temperatures (up to 120° C.) and to pressure. Hitherto, internally lined, metallic bodies have been used in particular, but as far as the Applicants know, there does not exist a water heater which is made entirely of plastic based mainly on polyester and which does not have external or internal metallic walls.

The prior art has already described how it is possible to obtain industrial products with a stratified structure reinforced by glass fibers. Thus, DE-A No. 1,951,326 describes how a tank can be obtained using a method whereby a polyurethane foam is introduced into the latter and hardens between an external metallic mold and an inflatable bladder. The metallic mold is coated with a layer of polyester adhesive which is covered with glass fibers. The bladder is held in position on the inside by a set of rings and stays. On the inside, the inflatable bladder is also lined with a layer of polyester adhesive on which a layer of glass fibers is arranged. After opening the external metallic mold and removing the inflatable bladder, a stratified structure made of glass-fiber polyester, with a core consisting of polyurethane foam, is obtained.

Hitherto, water-heater bodies without metallic parts, the core of which consists entirely of a polyester resin reinforced with glass fibers and which have an internal shell made of a material with alimentary properties, have not been known.

The containers made of glass fiber-reinforced plastic are generally obtained by arranging on a mold, serving as a model, a succession of layers of glass fibers bonded to each other by a synthetic resin. It is also known to manufacture these containers by rolling and sticking together plastic plates. These various methods are difficult to implement, are not suited for mass production and are unable to ensure that the containers obtained have uniform mechanical properties.

The present invention proposes a water-heater body as defined above, which can be obtained in a simple manner and at an extremely low manufacturing cost compared to water-heater bodies of the prior art.

As a result of the method according to the invention, it is possible to manufacture, in a reproducible manner, a plastic single-piece container which is nondecaying and resistant to corrosion and pressure. Moreover, using this method, it is possible to obtain ovoid or spherical shapes which ensure maximum capacity for a minimum surface area and are therefore more resistant to pressure and more economical. The invention relates to a method for obtaining a plastic water-heater body which has no metallic walls, either on the outside or on the inside, wherein (1) a shell made of plastic, preferably polypropylene, is used, which is intended to form the interior of the water heater and also serves as an internal molding wall, the said shell comprising at least one orifice, (2) the said shell is placed inside a mold consisting of two parts, while providing a space between the outside of the shell and the inside of the mold, the shell and at least one of the parts of the mold possessing cooperating means for centering and holding the shell inside the mold, the mold having an opening, (3) water is introduced into the internal shell via the said office, (4) a liquid mixture consisting essentially of a polyester resin composition capable of foaming and polymerizing is cast via the said opening of the mold, by cooling the outside of the mold to a temperature of approximately 10° to 15° C. during casting of the resin, so as to obtain a skin effect on the surface of the foam which comes into contact with the mold during polymerization of the said foam, by controlling the temperature of the expanding and polymerizing resin so that it does not exceed approximately 40° C., after which the two parts of the mold are removed and a water-heater body made of plastic based on reinforced polyester is obtained.

According to the invention, reinforcement of the polyester resin by means of glass fibers can be achieved in various ways. According to a first embodiment, the internal shell is coated, when positioned inside the mold, and on the external surface of the said shell, with glass fibers, preferably preformed so as to facilitate their positioning. It is also possible to line with glass fibers both or either one of the two parts of the mold, on the internal surface of the latter.

As a variation, cut glass fibers are used, which are introduced into the resin-based mixture and cast with the latter inside the mold.

The method according to the invention has crucial properties. The internal shell performs four functions. Firstly, it serves as an internal mold during implementation of the method. Secondly, when it is filled with water, it enables a resistance to be formed against the pressure resulting from expansion of the polyester resin mixture which is capable of foaming. Thirdly, the shell ensures the geometric shape corresponding to the internal capacity of the water heater to be manufactured. Finally, the shell is used as a means for controlling the temperature during molding, owing to the circulation of water inside the shell, as will be described below.

The material forming the shell must have alimentary properties in view of the fact that it is intended to contain water. It must also be able to withstand almost permanent operating temperatures of approximately 80° C., it being possible in some extreme cases for the temperatures to reach 120° C. According to the invention, polypropylene has proved to be the material which is best suited for satisfying these requirements.

The plastic internal shell can be made in several ways. For working volumes greater than approximately 300 liters, two half-shells can be manufactured by means of thermoforming and can be assembled by welding or bonding. It is also possible, in particular for smaller volumes, for example less than 300 liters, to manufacture the shell as a single piece by means of blow molding.

The shell must have at least one orifice which will perform several functions. Its first function will be to allow the introduction of water which will serve as a fluid for controlling the temperature during polymerization and foaming of the polyester resin. Secondly, the orifice is used to accommodate the electrical equipment with which the water heater will be provided. A third possible function of the orifice is to contribute towards centering and correct positioning of the shell inside the mold. For the reasons given above, the orifice in question should preferably be centered on the axis of symmetry of the shell.

The shell also has means intended to cooperate with corresponding means of the mold with a view to centering and holding the shell in position inside the mold. It is convenient to provide, for this purpose, a protuberance on the shell, preferably located opposite the abovementioned orifice and on the axis of symmetry of the shell, at the other end of the latter. Such a protuberance, together with the abovementioned orifice, will serve to hold the shell in position inside the mold during expansion of the foam, in such a way that the shell/mold assembly effectively resists the internal thrust exerted by the expanding foam.

Complementary mechanical means, accessible to a person skilled in the art, are provided for fixing the shell to the mold. These means may consist of bolts and nuts.

According to the present invention, it is also of vital importance to control carefully the polymerization conditions of the polyester resin. The cast liquid mixture is initially at a temperature equal to or higher than 20° C., that is to say at a temperature close to normal. A first controlling effect is achieved on the outside: when the resin is cast, the outside of the mold is cooled to a temperature of the order of 10° to 15° C., which has the effect of creating differential temperature conditions when contact occurs between the mold and the foam which is expanding and polymerizing. This means makes it possible to achieve a skin effect on the external surface of the foam which is in contact with the inside of the mold. This skin has a reinforcing effect.

Temperature control is also achieved on the inside, owing to the fact that the shell has been filled, before casting the resin, with water or another heat-transfer fluid. For numerous practical reasons, it is sufficient to fill the shell with water, without having to ensure a complementary water flow during the polymerization and expansion reaction. However, in some cases and depending on the choice of constituents for the polyester resin composition, it is also possible to ensure the flow of water inside the shell during the reaction. The temperature controlling effect, which is due to the water contained inside the shell, is intended to prevent this temperature exceeding approximately 40° C. during the reaction. The temperature gradient created during the reaction between the surface of the foam and the wall of the shell, cooled on the inside by the water, also causes the formation of a skin.

Selection of the polyester resin composition and of its constituents is not crucial and can be performed by a person skilled in the art. The only condition to be satisfied is that of providing a foaming composition which is capable of polymerizing in the temperature conditions defined above. In a manner known per se, the actual polyester resin may comprise, in addition to the foaming agent and the polymerization catalyst, filters such as calcium carbonate, which serve to homogenize the foam and also help control the rise in temperature during the polymerization reaction which is exothermic. The amino agent may be based of isocyanate and the catalyst on peroxide. A standard polyester resin composition is as follows: polyester resin: 100 parts by weight; filler (calcium carbonate): 50 parts by weight; foaming agent (isocyanate): 7 parts by weight; catalyst (peroxide): 4 parts by weight.

The average expansion factor of the resin mixture is from 3 to 4. Good results have been obtained with an expansion factor of approximately 3. As a result of this expansion factor, the foaming resin fills, in a complete and very intimate manner, all of the variable space between the internal shell and the external mold. A single-piece and leakproof water-heater body is thus obtained.

According to another feature, the invention relates to a water-heater body which has no internal and external metallic walls and comprises essentially a single-piece structure made of glass-fiber reinforced polyester, the said structure being surrounded, on one of its two surfaces, by an integrated skin and being connected, on its other surface, by means of a second skin, to a polypropylene shell forming the inside of the water heater.

In addition, such a water-heater body gives rise to improved thermal insulation. The coefficient of thermal conduction at 15° C. is 0.10 to 0.13 kw/m/°C.

Although the water-heater body with the abovementioned characteristic features meets perfectly the technical requirements of this type of apparatus, it may be desirable to improve its external insulation still further, by performing a conventional operation of duplicate molding using polyurethane foam. It is also possible to provide, in addition, for the positioning of a retractable plastic "sleeve" which has the function of improving the general external appearance.

In certain cases and in order to ensure even greater resistance to internal pressure, it is possible to provide for the insertion, over at least one part of the space of revolution separating the internal shell and the external mold, of a perforated metallic part, such as a grating or expanded metal, which is incorporated perfectly inside the expanded resin. The insertion of such a metallic part can also help lower the manufacturing cost, owing to the fact that the quantity of foam can be consequently reduced. Owing to the presence of such a wire gauze, the other metal components of the water heater, for example those required in order to fix the latter, such as the conventional fixing lugs, can be more easily provided. Finally, as mentioned above, the presence of such a metallic part helps ensure an even greater resistance to pressure.

Other advantages and characteristic features of the present invention will also become apparent from the detailed description given below with reference to the attached drawings in which.

Figure 1:
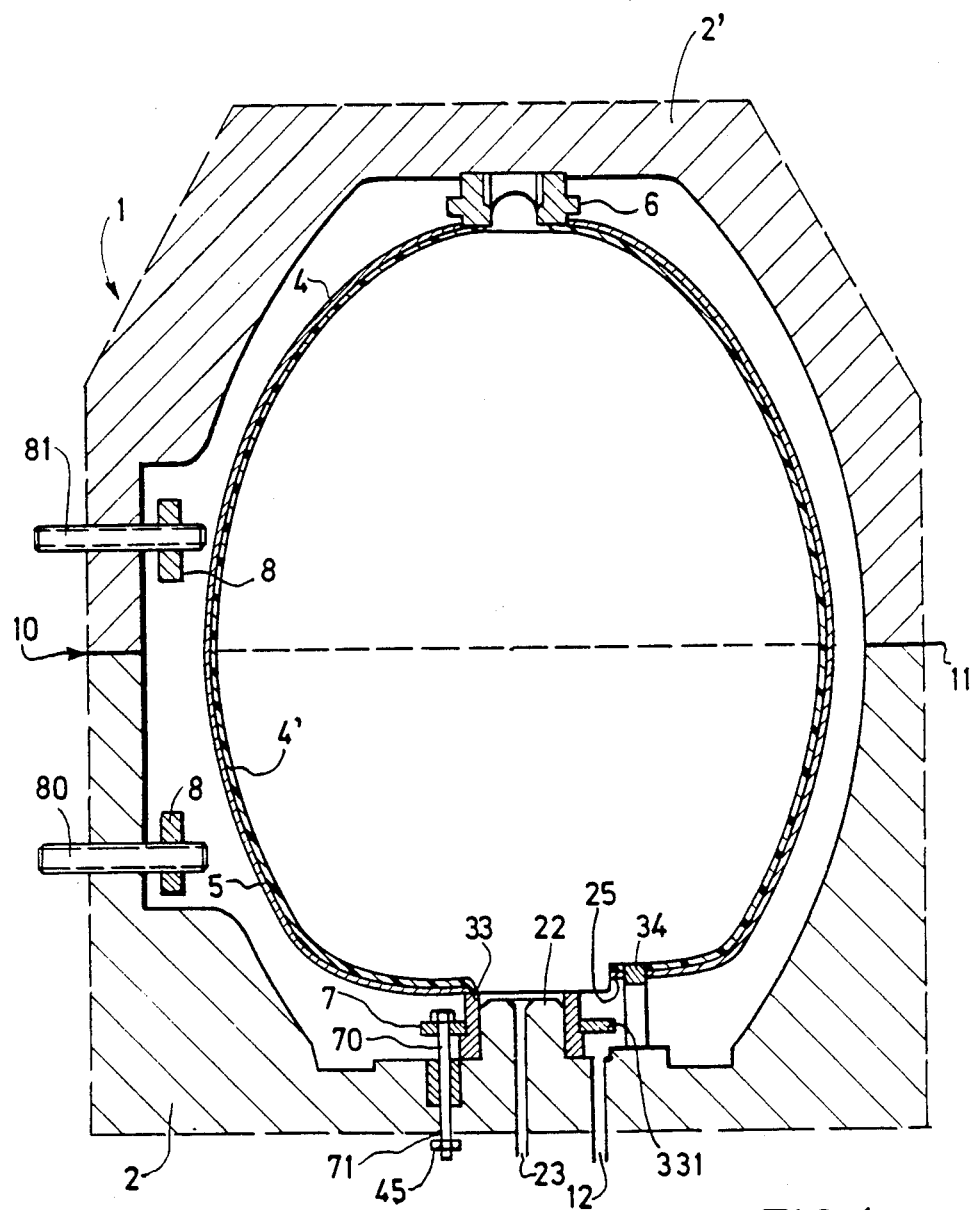
FIG. 1 is a sectional view of the molding assembly.

In FIG. 1, the molding assembly for implementing the method according to the invention is indicated by 1. It comprises an internal shell 4,4' which may be a whole blow-molded polypropylene shell or an internal shell consisting of two thermoformed polypropylene half-shells assebled by means of welding and/or bonding. The assembly 1 also comprises a first, metallic, external mold part 2 and a second, metallic, external mold part 2'. The bottom end of the shell 4,4' is fixed, by means of a connecting piece 33 with an external collar 331', as well as by means of a flange 7, screws 70 and sleeves 71, to the mold part 2. The shell 4,4' is lined with preformed glass fibers 5. Preferably, on the side of the orifice 90 which is intended to receive the electrical equipment in the finished product, a flange 7 integral with the shell 4,4' accommodates and has passing through it four screws or threaded bolts 70. It is important that the connection to the shell 4,4' is sufficiently resistant to thrust. The corresponding end of the shell 4,4' is fixed to the mold part 2 by screwing nuts 45 onto the threaded bolts 70. For the sake of clarity, only one bolt 70 and one nut 45 have been shown in FIG. 1. As already mentioned, the external mold consists of two parts 2,2'. After positioning the shell 4,4' inside the mold part 2, as mentioned above, the part of the shell 4,4' which projects from the said mold part 2 is in turn lined with glass fibers. The mold part 2' is positioned on the mold part 2 in the region of the mold joint 10, 11. Before joining the mold part 2 to the mold part 2', the nut 6 is fixed in the mold part 2' and the mold is closed by joining together the two parts 2,2'. After the mold has been closed, the shell 4,4' is held firmly in place, at its ends, by the flange 7 and the nut 6. It is important to note that, according to the present invention, the assembly consisting of flange 7, screws 70, sleeves 71 and nuts 45, provided in the mold part 2, can aso be provided in the corresponding mold part 2'. After bolting the two mold parts 2,2', the part 2 is positioned upwards, that is to say facing upwards. The shell 4,4' is provided, on the side where the mold part 2 is located, with two internal projections 25 which will form the passages for the hot water and cold water tubes. The projections 25 are partially cylindrical and, located close to them, is a flat surface with a hole 12 which will be used for introducing the liquid mixture. Preferably, the hole 12 has a diameter of 30 to 40 mm. It is important to note that the glass fibers 5 are preformed so as to facilitate their positioning. Two methods can be used in this connection. The glass fiber can be positioned as described above or cut glass fiber is added to the mixture, as is described below. It is then possible to proceed with the operation of casting the mixture. The mold part 2 of the shell 4,4' is filled with water via an orifice 23. The part 33 is integral with the shell 4,4' and the orifice 23 of the cylindrical projection 22 of the mold part 2 is used solely for introducing water so as to fill the shell 4,4' with water, at the required temperature. The shell 4,4' is filled with water at a temperature of approximately 20° C. Steps should be taken to ensure that no air is enclosed in the shell 4,4'. The shell 4,4' is filled with water right up to the brim. The orifice 23 is closed by means of a counterflange and a seal (not shown). It is also possible to provide for water to be circulated outside the mold.

Two threaded metallic inserts 8 are held in place inside the two external mold parts 2,2' by means of threaded rods 80,81. A stopper 34 seals the two projections 25. is performed by pouring in a liquid mixture, consisting of a polyester resin, a filler, a foaming agent and a catalyst, via the orifice 12 provided in the external mold. The unsaturated polyester resin is Sterpon ® manufactured by Etablissements Convert OYONNAX France; it consists of a polyester of saturated and unsaturated diacids and of glycol dissolved in a vinyl monomer. The filler is calcium carbonate; it is used to homogenize the foam and helps control the rise in temperature during the chemical reaction which is exothermic. The foaming agent is called EMC 20. This is an isocyanate-based product manufactured by the company WITNEY. The catalyst has the tradename M50 Luperox G 2N or PEROXYMON K1 and is manufactured by the company MONTE FLUOS; this product consists of methyl ethyl ketone peroxides.

Articles and publications relating to polyester foams and mentioning the state of the art of these products can be found in: Plastics Technology, March 1980; reference is made to the fact that Lasco Industries has produced polyester foams with a foaming agent as an additive. The foaming agent must be kept at a low temperature and must be well protected.

In Engineering and Processing News, July 1982, reference is made to a new molding technique involving the injection of polyesters.

Gloucester Engineering Co. Inc. 1982 describes polyester dispensers.

An article by James Ahneuiller et al. (Modern Plastics, July 1981) and Uniroyal Chemical Company states that polyester foams lead to a reduction in manufacturing costs and improve the insulation properties. However, the authors point out that numerous methods have been used to obtain polyester foams, but they have not been marketed with success.

Finally, Engineering Design, November 1980, describes what a polyester foam consists of.

It is advisable to make up the mixture in the following proportions: 0.50 parts by weight of filler, 0.07 parts by weight of foaming agent and 0.04 parts by weight of catalyst are used for 1 part by weight of polyester resin. In order to obtain a padding effect, expansion of the mixture occurs in a ratio of 3 or 4. The mixture is prepared as follows: the calcium carbonate filler is added to the polyester resin in the order given below. A preferred product is known under the name of Durcal 2 and is manufactured by the company OMYA PARIS France. These two products (the polyester resin and the filler) must be mixed thoroughly so as to prevent the formation of lumps which would impair the quality of the foam, that is to say its mechanical strength. In order to achieve this, during manufacture, there should be a permanent reserve supply of this mixture prepared 5 or 6 hours beforehand. The catalyst is then added. This must be mixed for a few minutes, and the same applies to the subsequent introduction of the foaming agent. The mixture must be perfect and contain an appropriate amount of catalyst so as not to burn the foam.

All the constituents in the mixture must be stored at a temperature higher than or equal to 20° C. The final mixture itself must also be at a temperature of 20° C.

As indicated above, the internal shell 4,4' is filled with water at a temperature of approximately 10° to 15° C. The shell 4,4' is, in theory filled to the brim. The water inside the shell has two effects: on the one hand, regulating the temperature and, on the other hand, counterbalancing the pressure due to the thrusting action of the foam during filling and during the chemical reaction. Expansion of the foam lasts between 60 and 120 minutes and, preferably, 90 minutes. During the reaction, the water which was initially at a temperature of 10° to 15° C. is raised to 20° C. and its temperature must not exceed 40° C. In this respect, a thermometer probe is connected in order to control the temperature.

Figure 2:
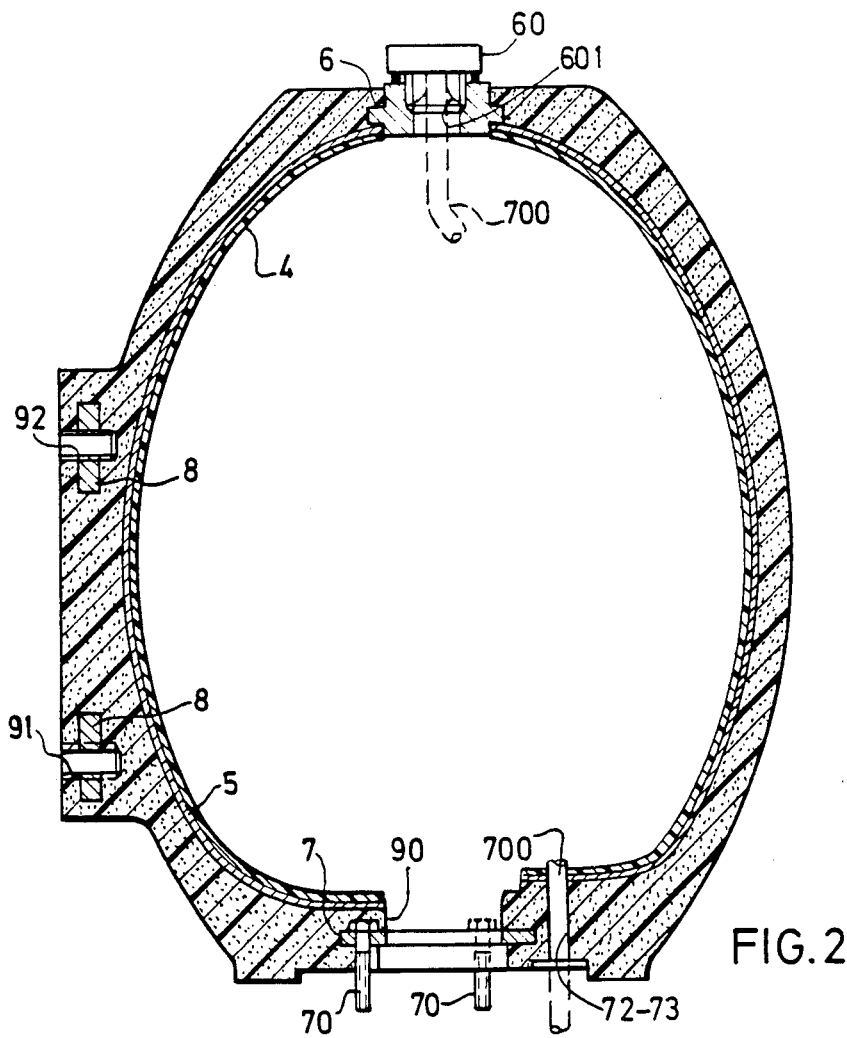
FIG. 2 is a section of the water-heater body obtained according to the method of the invention.

After casting the liquid mixture and removing the two external mold parts 2,2', the product shown in FIG. 2 is obtained. The water-heater body has fixing components 91, 92 anchored in the inserts 8. A stopper 60 is applied to the nut 6. A tube 700 is introduced and this tube 700 is held in place by the fins 601 provided in the stopper 60. At the other end, a heating resistor can be fixed by means of the screws 70, after the sleeves 71 have been removed. The hot-water and cold-water supply pipes can be attached by means of the two holes 72 and 73 provided in the projection 25.

Figure 3:
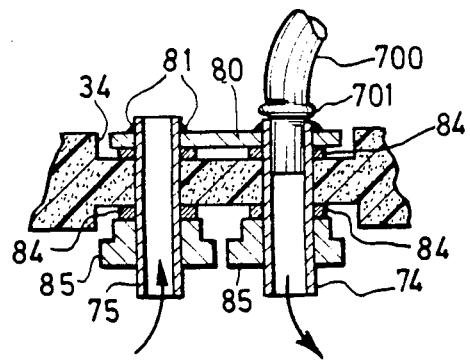
FIG. 3 shows the arrangement of the supply pipes in the water-heater body shown in FIG. 2.

To this end, as shown in FIG. 3, the two tubes 74 and 75 previously fixed to a plate 80 for example, by means of welds 81, are introduced, passing via the orifice 90, into the holes 72 and 73. The pipes 74, 75 are thus prevented from rotating when they are fixed to the water-heater body, by means of gaskets 84 and nuts 85. It is clear that the tube 700 intended to collect the hot water is introduced at the top and extends to the outlet 74. The flange 701 permits correct positioning. The heating resistance is fixed by means of the screws 70. The shell 4,4' must satisfy several criteria. It must meet the alimentary and temperature requirements. In fact, it must withstand an almost permanent operating temperature of approximately 80° C. and, in exceptional cases, a temperature higher than 100° C. Polypropylene satisfies the above requirements.

After obtaining the water-heater body in accordance with the method described above, it is possible to perform, if required, a conventional operation of external molding using, for example, polyurethane foam. A retractable plastic sleeve is able to cover the entire assembly and thus provides an agreeable appearance.

Usually, the temperature must be between 10° and 15° C. before casting the mixture, and a rotational movement is imparted to the assembly for the duration of three to four minutes in order to moisten all the surfaces. The temperature of the water is then reduced to approximately 20° C. The formation of a skin, on either side of the foam, provides additional mechanical strength on account of the sandwich effect.

Figure 4:
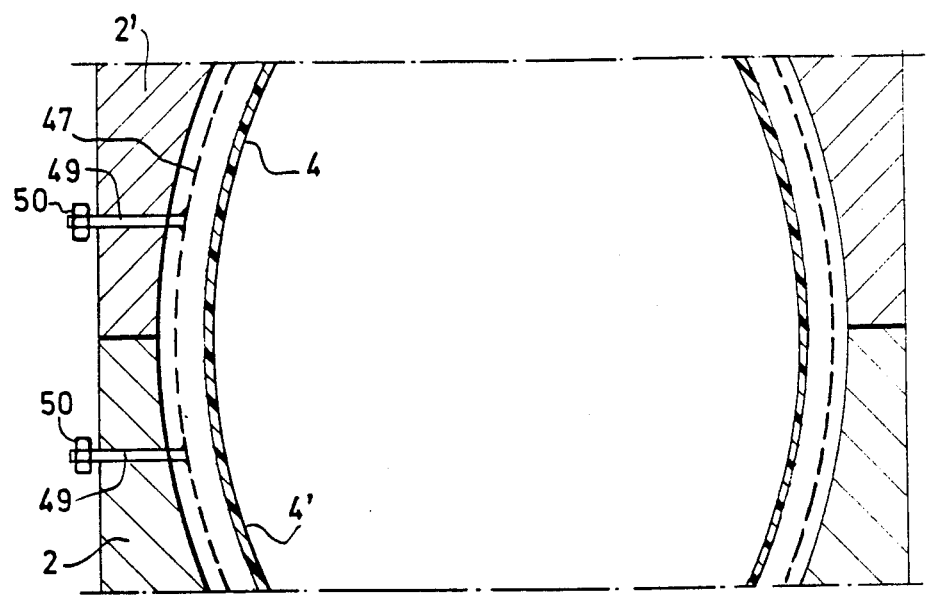
FIG. 4 shows the positioning of a metallic part between the shell and the mold.

In order to improve the manufacturing cost, according to a variation of embodiment of the present invention, as illustrated in FIG. 4, a perforated metallic part 47 is inserted in the space 48 located between the shell 4,4' and the external mold parts 2,2'. This perforated metallic part 47 is fixed by means of rods 49 and cap nuts 50. This perforated metallic part 47 is, in principle, located half way between the shell 4,4' and the metallic mold parts 2,2'. The thickness and texture can be chosen as required, depending on the final requirements of the product.

Figure 5:
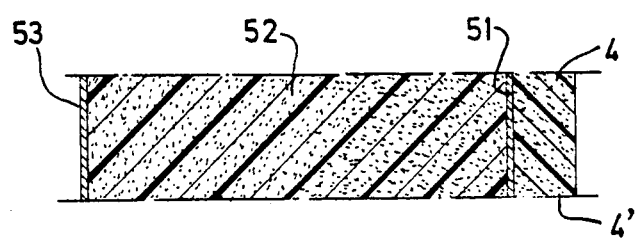
FIG. 5 is a diagrammatic shell portion of the structure of the water-heater body.

FIG. 5 shows a diagrammatic section through the finished product; in this Figure, the shell is denoted by 4,4' and the skin located close to the shell 4,4' is indicated by 51; 52 denotes the polyester and glass-fiber mixture, and 53 represents the other skin furthest away from the shell 4,4'.

It is important to note that, according to the present invention, a polyester and glass-fiber mixture is obtained and that the glass fibers are spread throughout the entire volume of the polyester foam. The two skins 51 and 53 represent a very thin part of only a few tenths of a millimeter and help improve the mechanical strength of the finished product.

We claim:

1. A water heater body which is devoid of internal and external metallic walls consisting essentially of a unitary structure having a plastic shell forming the interior of the water heater body, a molded in situ layer of foamed glass-fiber reinforced polyester resin surrounding and integral with said shell, at least one surface of said polyester resin layer comprising an integral skin.

2. The water heater claimed in claim 1 wherein both surfaces of the polyester resin layer comprise integral reinforcing skins.

3. The water heater claimed in claim 1 wherein said water heater body has a coefficient of thermal conduction at 15° C. of from 0.01 to 0.13 ks/m/°C.

4. The water heater claimed in claim 1 wherein a perforated metallic part is incapsulated in said layer of foamed glass-fiber reinforced polyester resin.

5. Method of fabricating a plastic water heater body which has no metallic walls, either on the outside or on the inside, which comprises:
   (1) providing a plastic shell having at least one orifice therein which forms the interior of the water heater body and also serves as an interior molding wall,
   (2) providing a mold having an opening therein and consisting of at least two parts, placing said shell inside said mold and providing a space between the outside of the shell and the inside of said mold, said shell and at least one part of the mold having cooperating means for centering and holding the shell inside the mold,
   (3) introducing a liquid into the inside of said shell through the orifice therein,
   (4) casting a liquid mixture consisting essentially of a polyester resin composition capable of foaming and polymerizing in said mold through the opening therein, controlling the temperature of the expanding and polymerizing resin during casting so that it does not exceed about 40° C. by cooling the outside of the mold to a temperature of from about 10° C. to about 15° C. so as to obtain a skin effect on the surface of the cast resin in contact with the mold, and thereafter removing the mold to provide a reinforcing plastic water heater body.

6. The method claimed in claim 5 including the step of reinforcing the polyester resin with fibers by coating the external surface of the shell with fibers prior to casting the polyester resin.

7. The method claimed in claim 6 including the step of reinforcing the polyester resin by lining the inner surface of at least one of the mold parts with fibers prior to casting the polyester resin.

8. The method claimed in claim 5 including the step of reinforcing the polyester resin by introducing cut fibers into the polyester resin composition prior to casting.

9. The method claimed in claim 5 wherein the shell is formed from polypropylene.

10. The method claimed in claim 5 wherein the shell comprises two thermoformed half-shells.

11. The method claimed in claim 5 wherein said shell comprises a unitary blow molded shell.

12. The method claimed in claim 5 wherein the orifice in said shell is centered on its axis of symmetry.

13. The method claimed in claim 5 wherein the cooperating means for centering and holding the shell inside the mold comprises a protuberance located opposite the orifice in the shell and on the axis of symmetry of the shell at its end opposite said orifice.

14. The method claimed in claim 5 including the step of additionally controlling the temperature of the polymerizing and expanding polyester resin by introducing a heat-transfer fluid into the interior of the shell prior to casting.

15. The method claimed in claim 14 including the step of circulating the heat-transfer fluid within the shell during polymerization of the polyester resin.

16. The method claimed in claim 5 wherein the polyester resin composition includes a foaming agent, a polymerization catalyst, and a filler.

17. The method claimed in claim 16 wherein said filler is calcium carbonate.

18. The method claimed in claim 17 wherein the polyester resin composition has the following composition:

Polyester resin: 100 parts by weight
filler (calcium carbonate): 50 parts by weight
foaming agent (isocyanate): 7 parts by weight
catalyst (peroxide): 4 parts by weight.

19. The method claimed in claim 18 wherein the average expansion factor of the polyester resin is 3-4.

20. The method claimed in claim 5 including the step of improving the external insulation of the water heater body by duplicate molding using polyurethane foam.

21. The method claimed in claim 5 including the step of inserting a perforated metallic part in at least a part of the space between the internal shell and the external mold prior to casting the polyester resin, whereby the metallic part is incorporated in the polyester resin as an incident of its polymerization.

* * * * *